(12) United States Patent
Vacanti

(10) Patent No.: US 7,239,266 B2
(45) Date of Patent: Jul. 3, 2007

(54) RADAR ALTIMETER

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 114 days.

(21) Appl. No.: 10/926,676

(22) Filed: Aug. 26, 2004

(65) Prior Publication Data

US 2006/0044182 A1    Mar. 2, 2006

(51) Int. Cl.
*G01S 13/08* (2006.01)
(52) U.S. Cl. ............. 342/120; 342/122; 342/128; 342/103; 342/195; 342/200
(58) Field of Classification Search ........... 342/120
See application file for complete search history.

(56) References Cited

U.S. PATENT DOCUMENTS

| | | | | |
|---|---|---|---|---|
| 4,695,013 | A * | 9/1987 | Trampnau | 244/17.13 |
| 4,945,360 | A * | 7/1990 | Trummer et al. | 342/122 |
| 4,967,201 | A * | 10/1990 | Rich, III | 342/175 |
| 5,719,581 | A | 2/1998 | Poe | |
| 6,043,758 | A * | 3/2000 | Snyder et al. | 340/970 |
| 6,373,427 | B1 * | 4/2002 | Hohne | 342/128 |
| 6,384,770 | B1 * | 5/2002 | de Gouy et al. | 342/120 |
| 6,407,697 | B1 * | 6/2002 | Hager et al. | 342/120 |
| 6,426,717 | B1 | 7/2002 | Maloratsky | |
| 6,486,826 | B1 * | 11/2002 | Cramer et al. | 342/124 |
| 2002/0066829 | A1 | 6/2002 | DeWitt et al. | |
| 2003/0201930 | A1 * | 10/2003 | Nagasaku et al. | 342/175 |
| 2004/0130482 | A1 * | 7/2004 | Lin et al. | 342/82 |
| 2004/0135703 | A1 | 7/2004 | Arnold et al. | |

OTHER PUBLICATIONS

Ayasli, Y. and Reynods, L. "Single chip FMCW Radar for Target Velocity and Range Sensing Applications". Gallium Arsenide Integrated Circuit (GaAs IC) Symposium, Oct. 22, 1989-Oct. 25, 1989. Technical Digest 1989. pp. 243-246.*

* cited by examiner

*Primary Examiner*—Thomas H. Tarcza
*Assistant Examiner*—Matthew M. Barker
(74) *Attorney, Agent, or Firm*—Black Lowe & Graham PLLC

(57) ABSTRACT

The present invention provides a radar altimeter system with a closed loop modulation for generating more accurate radar altimeter values. The system includes an antenna, a circulator, a receiver, and a transmitter. The circulator receives or sends a radar signal from/to the antenna. The receiver receives the received radar signal via the circulator. The transmitter generates a radar signal and includes a phase-locked loop circuit for generating the radar signal based on a pre-defined phase signal. The transmitter includes a direct digital synthesizer that generates the phase signal based on a pre-defined clock signal and a control signal. The system includes a digital signal processor and a tail strike warning processor that determine position of a tail of the aircraft relative to ground and present an alert if a warning condition exists based on the determined position of the tail of the aircraft and a predefined threshold.

20 Claims, 6 Drawing Sheets

RADAR ALTIMETER

FIELD OF THE INVENTION

This invention relates to radar altimeters.

BACKGROUND OF THE INVENTION

Typical aircraft radar altimeters include a separate receiving antenna and transmission antennas located on the bottom of the fuselage of commercial or private aircraft. Separate transmit and receive antennas have historically been used in order to provide isolation between the transmitter and receiver during continuous transmission and reception of a radar signal. Transmitter to receiver isolation was required because of technology shortcomings of microwave signal sources and microwave device packaging technology. Similarly, microwave sources used in present radar altimeters used open loop methods because microwave devices did not exist to permit closed phase lock loops. Technology now readily available permits exceptionally low phase noise signals with exceptionally high quality linear frequency modulation under virtually any load or environmental conditions.

Operation of existing radar altimeters relies on a reflection of the transmitting antenna signal from the ground to the receiving antenna. At high altitudes, the separation distance between transmit and receive antennas results in a small reflection angle between the transmitted and received signals and provides excellent signal reception. At much lower altitudes as the aircraft lands, the reflection angle between the transmitting and receiving antennas becomes very large thereby attenuating signal reception at the outer reaches of the antenna beamwidths. Below a low altitude threshold the reflection angle will exceed the beamwidth of the transmitting or receiving antennas and altimeter operation will cease. Therefore, at low altitudes the separation distance between the two antennas of conventional radar altimeters reduces received signal strength compromising signal to noise ratio and altitude accuracy. At low altitudes, conventional dual antenna altimeters may erroneously acquire reflections from aircraft components such as engines and wheel gear instead of the correct ground reflection. A single antenna radar altimeter uses a single vertical reflection path to and from the ground not impacted by altitude or attitude of the aircraft. In special applications such as an aircraft tail-strike protection system there is a requirement to measure distances to the ground of less than one foot where a dual antenna altimeter will not function. Therefore, there are many needs for a single antenna FM radar altimeter.

The U.S. Pat. No. 6,426,717 to Maloratski presents a single antenna FM radar altimeter that performs continuous wave (FM/CW) modulation as well as an interrupted continuous wave modulation. FIG. 1 illustrates Maloratski's radar altimeter. Maloratski includes a circulator that directs transmission signals to the antenna or directs received signals through a radar-processing portion. Maloratski connects the circulator to the antenna via a coax cable, as it is the intent of the patent to remotely locate the radio frequency components of the altimeter from the antenna. Precision low range altimeter applications require exceptionally stable altitude data. However, temperature and moisture affect coax cables by increasing insertion loss, increasing reflection coefficients and changes in propagation delay time. Therefore, no means exists to continuously calibrate the true electrical length of the connecting cable. Any radar altimeter connected to its antenna or antennas via coax must calibrate propagation delay in order to know fixed distance to and from the transmitting and receiving antenna(s) caused by the electrical length of the coax for each aircraft installation.

Maloratski also presents closed loop analog circuitry for continuously adjusting modulation rate in order to produce a constant frequency received signal but the loop does not control the linearity or phase noise of the radar modulation. Any frequency modulated radar altimeter relies upon a nearly ideal linear modulation function of frequency change versus time. Maloratski's closed loop analog circuitry provides no means to verify that the modulation function is nearly ideally linear as a function of time, temperature or other environmental effects because it only controls the frequency of the received signal. In this way, Maloratski's approach uses an open loop modulation system.

Radio frequency sources of many types are subject to Frequency Pulling as a function of load impedance. As a result, open loop modulation systems suffer distortion in the linearity of the frequency modulation function due to the varying Voltage Standing Wave Ratio (VSWR) caused by coax cable deterioration or poor antenna matching. Poor modulation linearity results in degraded signal to noise ratio, altitude accuracy and causes errors in measurements of modulation rate.

Many conventional radar altimeters, including the single antenna altimeter proposed by Maloratski continuously adjust the period of the linear frequency modulation waveform as a function of altitude in order to achieve a constant received difference frequency. This constant received difference frequency is key to the altitude tracking mechanism of Maloratski and most prevalent radar altimeters. While this design feature provides a means to facilitate analog altitude tracking subsystems, it forces the altimeter to also provide an automatic gain control circuit that adjusts the amplitude of the received signal as a function of altitude and reflection brightness from the ground. This design feature complicates the altimeter design and imposes limitations to the response time of the overall altimeter circuitry with rapidly varying ground heights.

A basic concern for Frequency Modulated/Continuous Wave (FM/CW) radars with a single antenna is a large signal reflection from its antenna or connecting coax. Large amplitude reflections from the antenna or connecting coax cause the continuously transmitting radar to jam itself, thereby limiting sensitivity. Maloratski and others have utilized specialized cancellation circuitry in an attempt to prevent FM/CW self-jamming.

Therefore, present single antenna radar altimeter systems, like Maloratski, are overly complex, utilize open loop modulation and are relatively imprecise because of time and temperature changes and degraded RF performance due to coax cable degradation over time.

Therefore, there exists a need for a single antenna FM radar altimeter with no degradation in RF performance versus time, and no issues relating to connection distances between the antenna and the other radar altimeter hardware, and it is not prone to modulation errors, and is more accurately repeatable over time.

SUMMARY OF THE INVENTION

The present invention provides a radar altimeter system with a digitally programmable closed loop modulation that exhibits a constant sweep rate and bandwidth while providing near ideal linearity. By directly incorporating the antenna into the structure of the transmitter and receiver, the design eliminates the need for connecting coax and by design provides near ideal antenna impedance matching (e.g., voltage standing wave ratio (VSWR)≈1.2:1) in order to control FM/CW self-jamming. The present invention optimizes range resolution, signal to noise ratio and provides mutual interference avoidance with adjacent altimeters by operating at accurately set frequency offsets and modulation rates.

The system includes an antenna, a circulator, a receiver, and a transmitter. The circulator receives or sends a radar signal from/to the antenna. The receiver receives the received radar signal via the circulator. The transmitter includes a phase-locked loop (PLL) circuit for generating the radar signal.

In accordance with further aspects of the invention, the transmitter includes a direct digital synthesizer that generates the PLL reference signal based on a predefined clock signal and a control signal.

In accordance with other aspects of the invention, the system includes a digital signal processor (DSP) that generates the control signals and processes the signal received by the receiver.

In accordance with still further aspects of the invention, the system includes an altitude computation processor in signal communication with the digital signal processor. The altitude computation processor determines position of the altimeter antenna relative to ground based on the radar signal processed by the digital signal processor and altitude computation processor. The location of the invention single antenna may be placed near the landing gear to assist in landing or under the aircraft tail to warn of an impending impact of the tail with the ground should the aircraft pitch at too great an angle on take off. In this application an output device in signal communication with aircraft flight control system functions as a tail strike warning system based on predetermined tail to ground clearance distances.

In accordance with yet other aspects of the invention, the antenna is a micro-strip antenna that is integrally part of the radar transmitter and receiver circuitry. The receiver and transmitter circuitry is located on one side of a microwave circuit board and directly connected to the antenna located on the opposite side of the transmitter and receiver circuitry. Thereby reducing the distance between the transmitter and receiver and the antenna to the smallest possible limit and eliminates the need for calibration of the altimeter to antenna propagation-delay time. In accordance with the incorporation of the antenna with the transmitter and receiver, this invention therefore eliminates calibration due to the location of the antenna installation location and permits the integral antenna and receiver/transmitter anywhere on an aircraft fuselage.

In accordance with still another aspect of the invention, the antenna, transmitter and receiver circuitry is included in a housing that is hermetically sealed.

In accordance with yet another aspect of the invention, a constant modulation period causes changes in altitude to result in a linear change in the difference frequency of an FM/CW receiver. The invention provides a 6 dB per octave high pass filter in the receiver such that the amplitude of a given radar cross-section reflection remains constant as a function of altitude. The high pass filter eliminates the need for automatic gain control and provides a means to instantly compensate for signal amplitude variation as function of altitude. The invention includes an analog to digital converter with a sufficient number of bits to account for the variation in the amplitude of the reflected signal caused by a wide range of reflectivity of the ground.

In accordance with one other aspect of the invention, the Digital Signal Processor (DSP), altitude computation and all other altitude and Input/Output functions of the altimeter are designed to be remotely located from the integrated antenna, transmitter and receiver hermetic assembly. Simple serial communications methods transmit digitized data and control signals between the antenna assembly and the DSP and Altitude computational functions. The digital control and signal processing functions may be located anywhere on the aircraft or integrated with other navigational functions. This invention therefore permits the installation of a radar altimeter in any aircraft without the need for coaxial cable interconnects, thereby reducing installation costs and weight.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
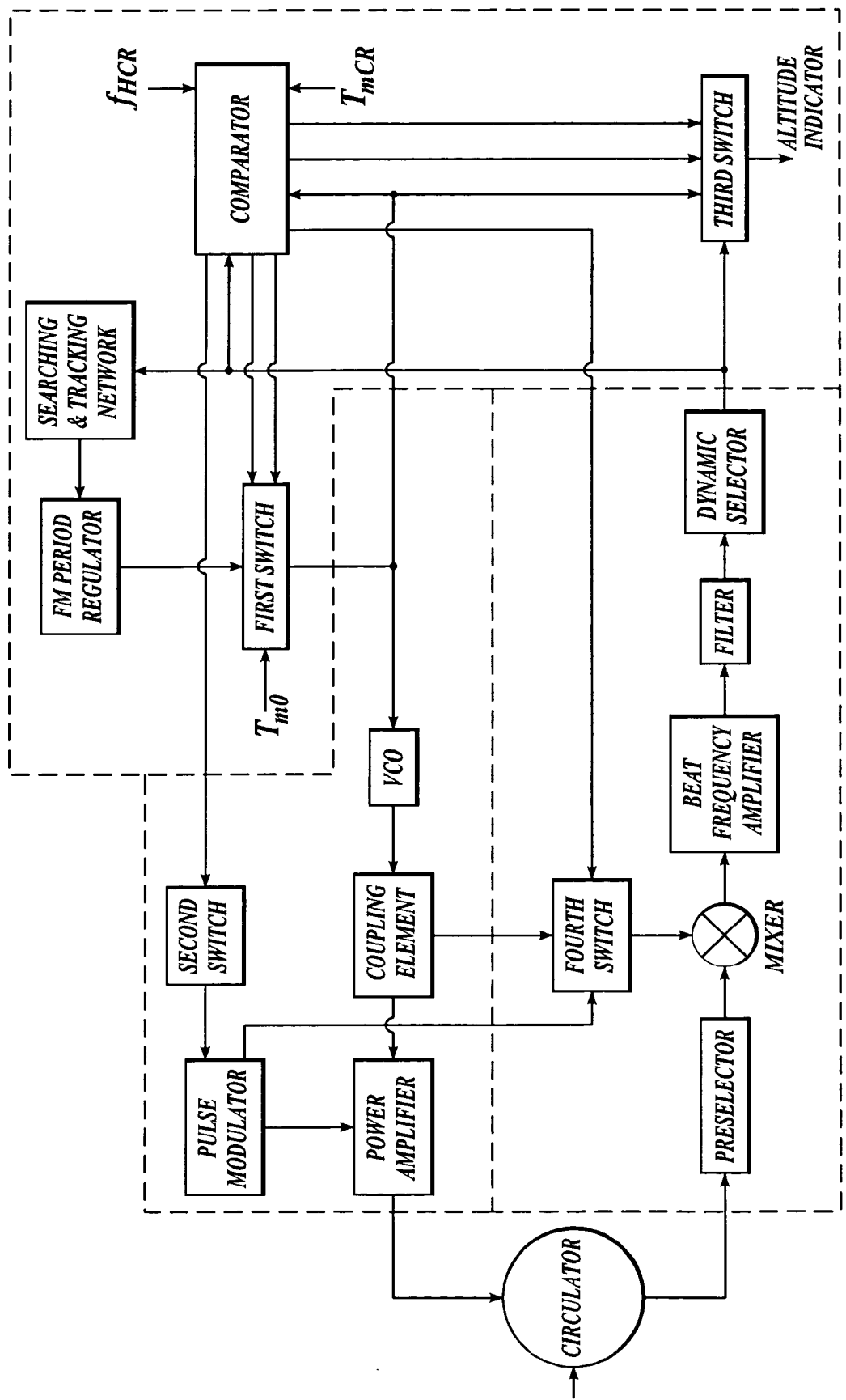
FIG. 1 illustrates a block diagram of a prior-art radar-altimeter system.
Figure 2:
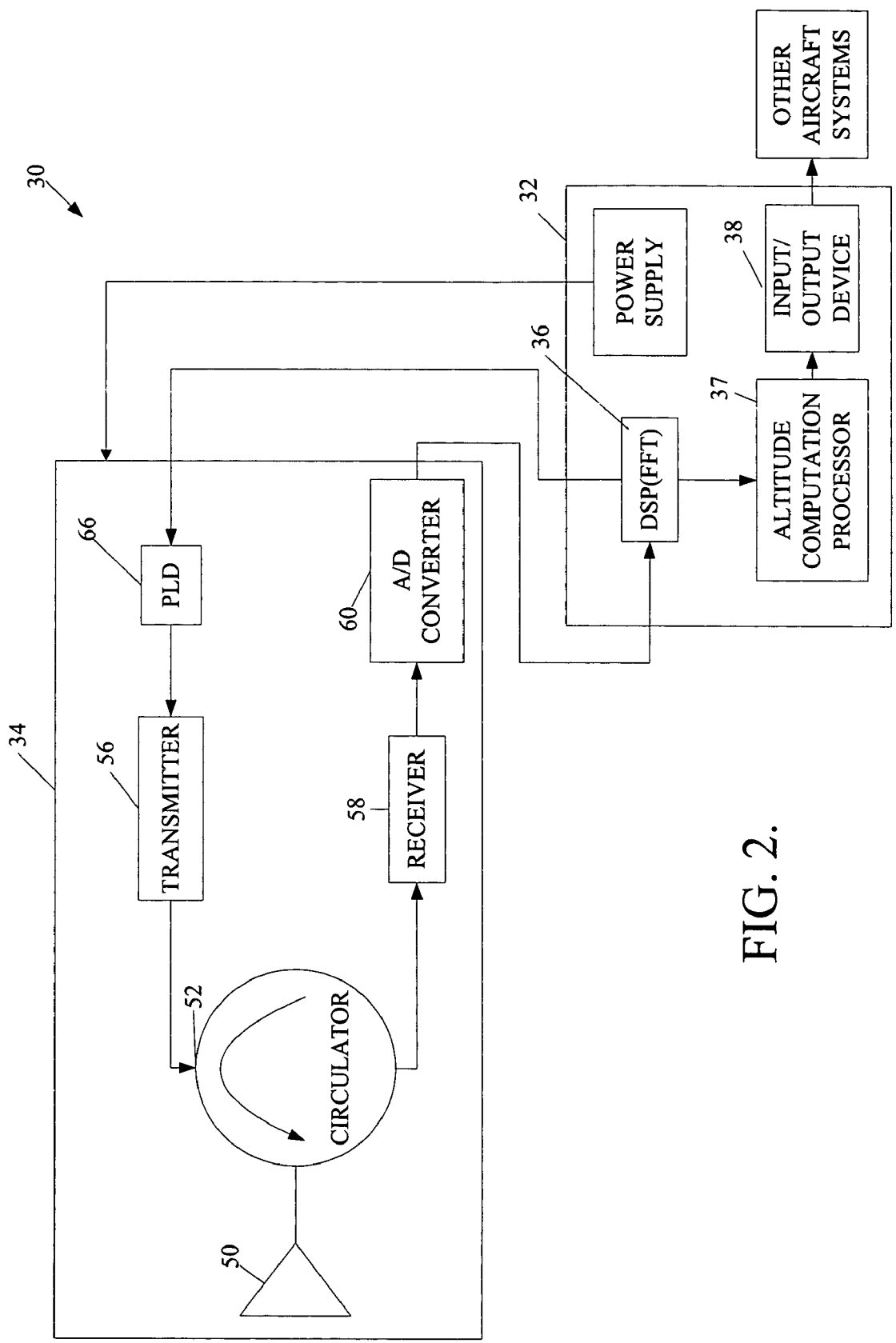
FIG. 2 illustrates a block diagram of a radar altimeter and tail strike warning system formed in accordance with the present invention.

FIG. 2 illustrates a system 30 that provides more accurate radar altimeter measurements and tail strike warnings. The system 30 includes a radar altimeter 34 and an signal processing system 32. The signal processing system 32 includes a processor 36, an Altitude Computation Processor (ACP) 37 and an input/output device 38. In one embodiment, the processor 36 is a digital signal processor (DSP) with Fast Fourier Transform (FFT) or a Field Programmable Gate Array (FPGA). The radar altimeter 34 is in signal communication with the signal processing system 32 and other aircraft systems, such as a ground-proximity warning system. The radar altimeter 34 sends serial data produced by an Analog to Digital (A/D) Converter 60 to the processor 36, which in turn transfers altitude bin data to the ACP 37. The ACP 37 analyzes distance to ground values and may generate a tail strike warning based on the analysis. If the ACP 37 produces a tail strike warning, the input/output device 38 presents a warning to the flight crew. The ACP 37 determines an altimeter value by determining position of the digital signal.

The radar altimeter 34 includes a single antenna 50 coupled to a circulator 52. The circulator 52 is a conventional circulator commercially available to provide coupling of a transmitter 56 and a receiver 58 to the antenna 50 and provide isolation between the transmitter 56 and the receiver 58. The transmitter 56 is in signal communication with a Programmable Logic Device 66. The receiver 58 is in communication with the A/D Converter 60.

An example of the DSP 36 is suitably a Texas Instruments' TI320C33. Alternately, a field programmable gate array (FPGA) may compute the Fast Fourier transformations required to form altitude range gates.

Figure 3:
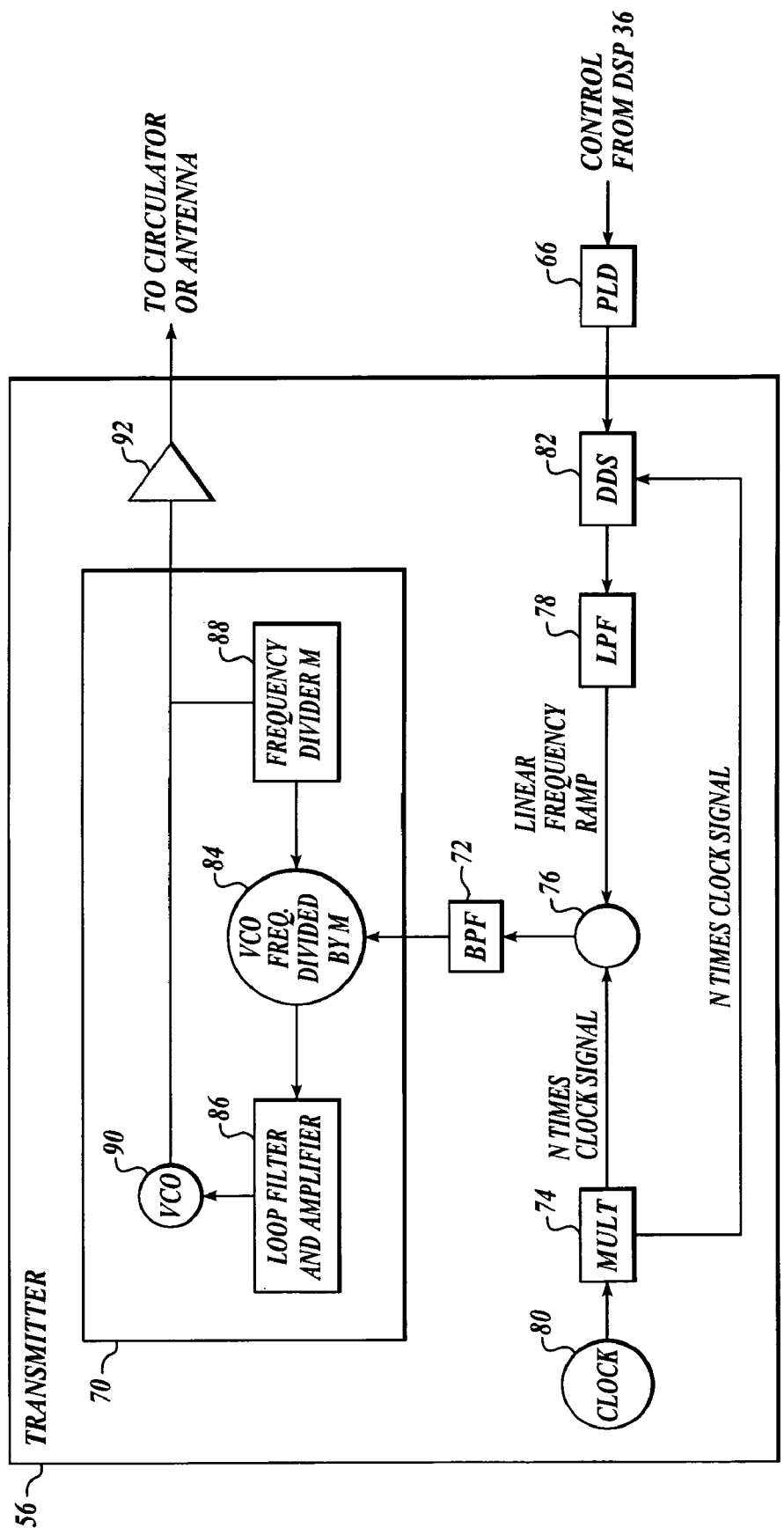
FIG. 3 illustrates components of a transmitter included within the system shown in FIG. 2.

FIG. 3 illustrates components of the transmitter 56. The transmitter 56 includes closed-loop circuit 70, such as a phase-locked loop (PLL) circuit. In one embodiment, the circuit 70 includes a voltage-controlled oscillator (VCO) 90 that generates an output radar signal and a frequency divider 88 that scales the output of the VCO 90 from a microwave or millimeter wave frequency to a high VHF or UHF frequency. The circuit 70 compares the output of the frequency divider 88 with a reference signal generated by a direct digital synthesizer 82, a low pass filter 78, a band pass filter (BPF) 72, a mixer 76, and a frequency multiplier 74 and adjusts the output frequency of the VCO 90 such that it follows the frequency and phase of the digitally synthesized reference signal. The frequency multiplier 74, mixer 76 and filters 72 and 78 are used to translate the linear frequency ramp of the Direct Digital Synthesizer 82 up to UHF frequencies where it is compared directly with the UHF frequency output of the frequency divider 88 in a phase/frequency detector 84. A loop filter and amplifier 86 generates a tuning control signal for the VCO 90 based on the comparison done at the detector 84. The closed loop modulation of the VCO 90 output flows to an amplifier 92 and circulator 52 for output through the antenna 50.

Figure 4A:
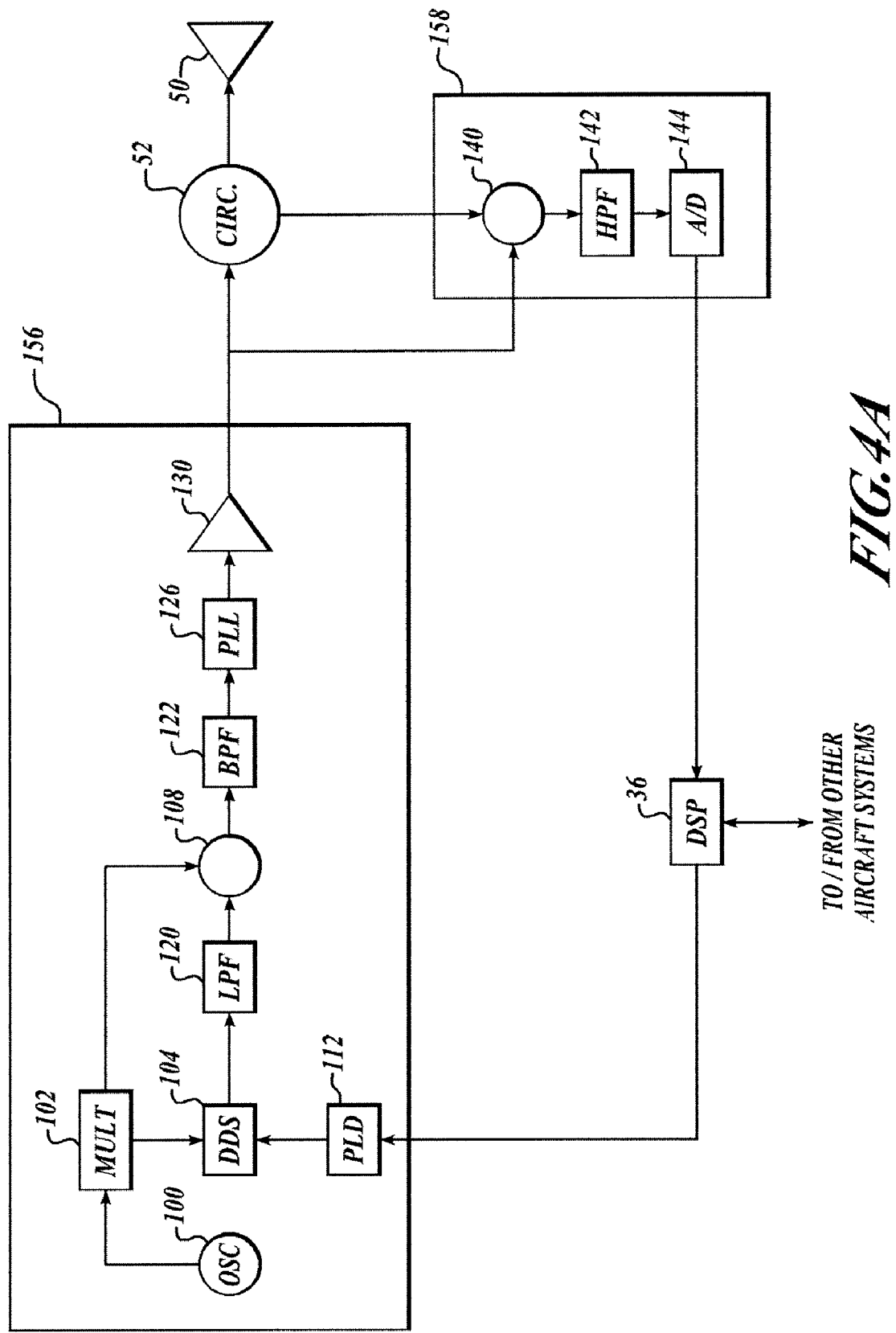
FIG. 4A illustrates detailed electronic components of a radar altimeter formed in accordance with the present invention.

FIG. 4A illustrates a single antenna embodiment of the radar altimeter 34. The transmitter 56 includes a first oscillator 100 for producing a clock signal. The frequency multiplication circuit 102 raises the clock signal frequency by a factor N such that it is sufficiently high to operate the direct digital synthesizer 104 and offset the output of the synthesizer 104 to the UHF band when the two are combined in mixer 108 and filtered by bandpass filter 122. The DSP 36 sends a control signal to a programmable logic device (PLD) 112 that converts the DSP 36 commands into DDS 104 commands that translate into a linear frequency modulation of a particular bandwidth and period or a calibration or self-test process. The DDS 104 generates a high quality linear FM ramp by generating precise discrete sinusoidal amplitude samples at the rate of the clock frequency signal generated by the multiplication circuit 102. The discrete sinusoidal amplitude samples that comprise the linear FM ramp produced by the DDS 104 pass through low pass filter (LPF) 120 where the output becomes a continuous analog signal at VHF frequencies. The continuous linear frequency modulation is added to the output of the frequency multiplication circuit 102 at mixer 108. The output of the mixer 108 is band limited by band pass filter (BPF) 122 and becomes a UHF reference signal at the input of the phase and frequency detector 154 of phase-locked loop (PLL) circuit 126. The phase and frequency detector measures the instantaneous error between the frequency scaled input of Frequency divider 152 and the linear frequency modulation output of bandpass filter 122. The amplified error signal is band limited by the loop filter and amplifier 156. The output of the loop amplifier and filter 156 is applied to the voltage tuning input of the microwave or millimeter wave VCO 150. In this manner, the instantaneous frequency of the VCO 150 follows the linear frequency modulation of DDS 104. The internal DDS digital calculations and the timing provided by the multiplied clock frequency determine the DDS 104 output. Native non-linearities in the VCO tuning characteristics or those induced by external load conditions or external environment are automatically corrected by the measurements provided in the phase and frequency detector 154. The linear frequency modulation produced by the PLL 126 is amplified to the required transmitter power levels by amplifier 130. Receiver Mixer 140 receives a small fraction of the output of amplifier 130 as the reference input of mixer 140 in receiver 58. Mixer 140 subtracts the reference signal provides by the transmitter amplifier 130 from the signal received by the antenna 50 via the circulator 52. The frequency difference generated by mixer 140 flows through high pass filter (HPF) 142, which filters the received analog signal and sends it to an analog to digital (A/D) converter 144. The digital output of the A/D converter 144 arrives at the input of DSP 36. The DSP 36 computes Fast Fourier Transforms (FFT) of the sampled data. The resulting frequency bins of the FFT correspond to incremental altitude bins. The ACP 37 uses algorithms to evaluate the altitude frequency bins to determine the aircraft height above the ground. Those algorithms may also determine if the potential exists for a tail strike during take off and report that information via the Input/Output Device 38 to other aircraft systems such as the flight controls or flight management system.

Figure 4B:
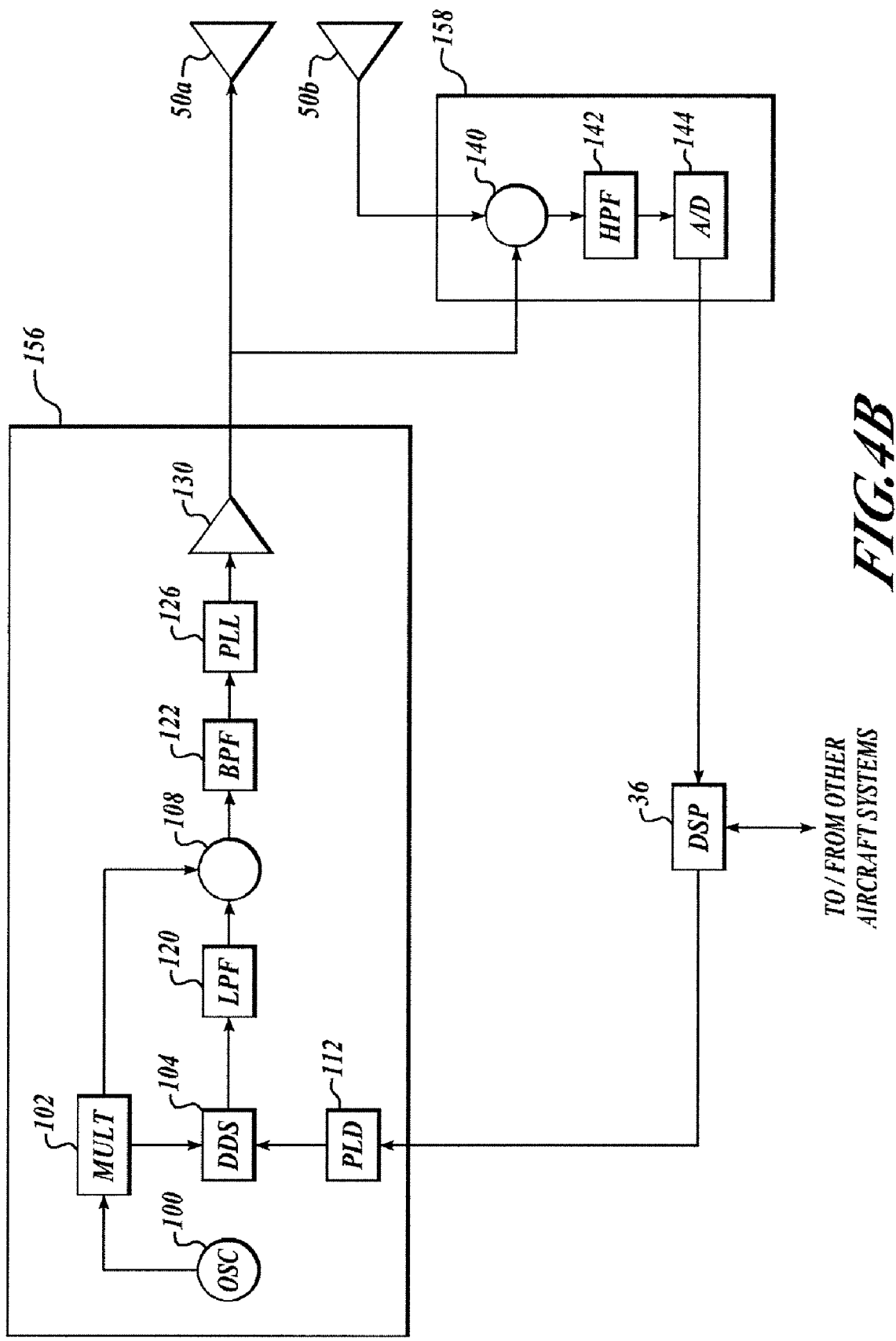
FIG. 4B illustrates detailed electronic components of an alternate radar altimeter formed in accordance with the present invention.

As shown in FIG. 4B, a transmission antenna 50*a* and a reception antenna 50*b* replace the single antenna 50 and circulator 52 as shown in FIG. 5A. This dual antenna configuration is useful where low transmitter power levels used in a single antenna system would limit the required maximum altitude range of the altimeter. In this case the circulator 52 is removed and the required isolation between transmitter and receiver is achieved by separate transmit and receive antennas in a single hermetic package. In this embodiment, the invention continues to incorporate closed loop digital synthesis of the linear frequency modulation, but measurement of very low altitudes are restricted to those ranges where the adjacent antenna beamwidths continue to overlap. The signal processing portion of the altimeter may continue to be located any where on the aircraft via serial data connections to the integrated antenna and microwave package.

In one specific embodiment of the transmitter 56, the output of the transmitter 56 is a linear frequency sweep of 200 MHz modulated bandwidth between 4200-4400 MHz. In order to get this desired output, the DSP60 instructs the DDS 104 via the PLD 112 to generate a signal having a bandwidth between 82.7-104.9 MHz. The frequency of the first oscillator 100 is 128 MHz and the multiplication factor of frequency multiplier 102 is three. Therefore, the output of the multiplication circuit 102 is 384 MHz and when combined at the mixer 108 produces a signal having a bandwidth between 466.7-488.9 MHz (having a center at 477 MHz) at the output of the BPF 122. The PLL circuit 126 includes a voltage-controlled oscillator (VCO) 150 that can be tuned at least 300 MHz centered about 4300 MHz. Frequency divider 152 divides the VCO 150 generated 4300 MHz signal by a factor of 9 which results in an output frequency range of 466.7 MHz and 488.9 MHz when the tuning range of VCO 150 lies between 4200 MHz and 4400 MHz. Output of frequency divider 152 is compared to the output of bandpass filter 122 that contains the reference 466.7 to 488.9 MHz linear frequency sweep generated by the DDS 104 and the multiplied frequency output of frequency multiplier 102. Any frequency or phase error between the reference signal and the frequency divided VCO 150 signal is corrected by the error amplifier and filter 156 by tuning the VCO 150 to achieve the correct frequency or phase within PLL 126.

The output radar signal produced by the transmitter 56 has a more definite defined range than prior art systems, thus providing greater differentiation of the center of the radar signal from side lobes. In addition, the outputted radar signal over time exhibits a more linear relationship between frequency and time due to less distortion.

Figure 5:
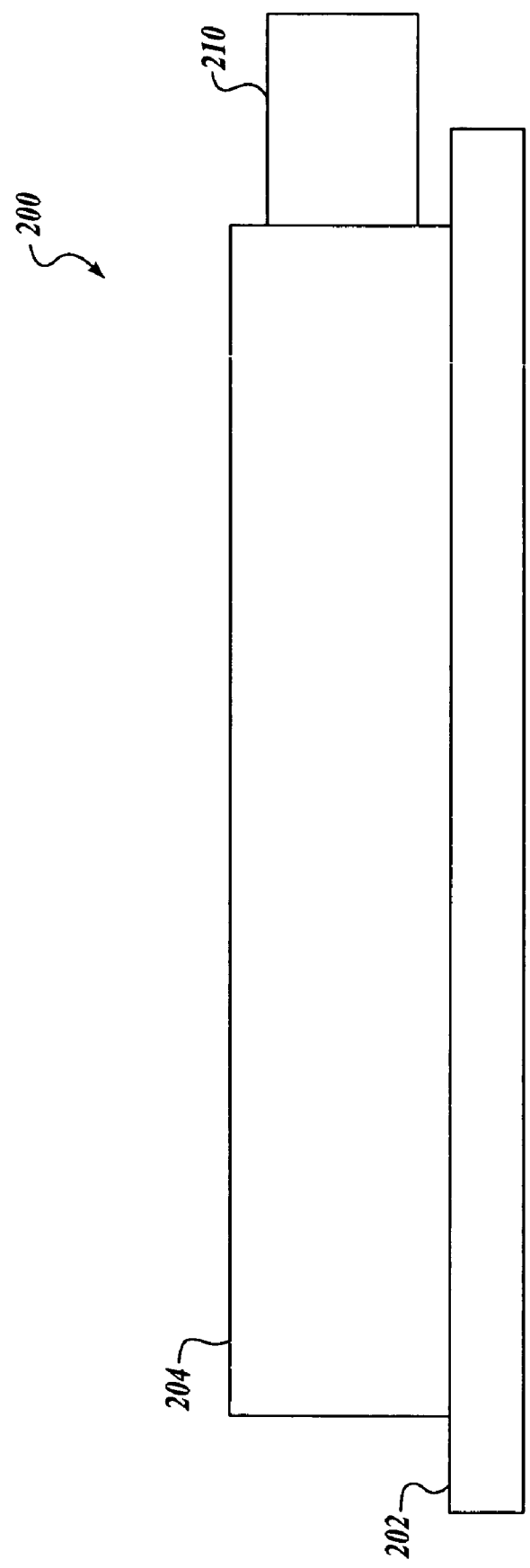
FIG. 5 illustrates a side view of a radar altimeter formed in accordance with the present invention.

FIG. 5 illustrates a side view of a radar altimeter 200 packaged for use in an aircraft. The radar altimeter 200 includes a single micro-strip antenna 202 with a housing 204 attached to a back side of the antenna 202. Included within the housing 204 are the circulator 52 (in a single transmit/receive antenna configuration), the transmitter 56, and the receiver 58. In one embodiment, the housing 204 is a welded cover that is hermetically sealed to the antenna 202. Wires extending from the DSP 36 pass through a waterproof connector 210, thereby ensuring that the electronics within the housing 204 are protected from the environment. In another embodiment, the DSP 36 is included in the housing 204.

Because the components of the radar altimeter 200 are attached directly to the antenna 202, a coax cable connecting the circulator 52 to the micro-strip antenna 202 is not necessary. In this embodiment, the micro-strip antenna 202 is connected as closely as possible to a circuit board that includes the circulator 52, transmitter 56, receiver 55, and DSP36. In one embodiment, the distance between the circulator 52 (circuit board) and the micro-strip antenna 202 is approximately 0.1 inch. The present invention exhibits constant modulation quality and signal-to-noise ration over time, thereby eliminating the need to recalibrate after installation or later. The modulated radar signal produced by the transmitter has a linearity error value of less than 0.5%.

In one embodiment, the circuit board and circuit components are a Silicon Gremanium (SiGe) Monolithic Microwave Integrated Circuit (MMIC). It can be appreciated that other configurations are possible.

If the radar altimeter 34 is not located at the tail of the aircraft, tail strike processing may include other information, such as pitch, or roll, received from other aircraft systems, such as the Flight Management System (FMS) or Flight Control System (FCS).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radar system on an aircraft, the system comprising:
an antenna for outputting and receiving a radar signal;
a circulator in signal communication with the antenna;
a receiver for receiving the radar signal via the circulator; and
a transmitter for generating a radar signal, the transmitter comprising:
a phased-lock loop circuit for generating the radar signal;
a direct digital synthesizer for generating a reference signal based on a pre-defined clock signal and a control signal;
an oscillator and multiplier component for generating a clock signal; and
a mixer for offsetting the reference signal by combining the reference signal with the clock signal,
wherein the phased-lock loop circuit generates the radar signal based on the offset reference signal, wherein the offset reference signal is greater than at least 30 MHz.

2. The system of claim 1, wherein the antenna is a micro-strip antenna.

3. The system claim 2, wherein the circulator, the receiver, and the transmitter are formed on a circuit board, the circuit board being connected to the antenna, wherein the circulator and antenna are connected by printed wiring.

4. The system claim 3, wherein the distance between the circuit board and the antenna is less than one inch.

5. The system of claim 3, further comprising:
a housing for hermetically sealing the circuit board.

6. The system of claim 5, further comprising an analog-to-digital converter for converting the signal received by the receiver into a digital signal, wherein the converter is formed on the circuit board.

7. The system of claim 6, further comprising:
a component for generating the control signal and for processing the digital signal, wherein the component is remotely located from the housing.

8. The system of claim 7, wherein the component is located in an electronics bay of the aircraft.

9. The system of claim 7, further comprising:
a tail strike warning component in signal communication with the component for determining position of a tail of the aircraft relative to ground based on the processed digital signal.

10. The system of claim 9, further comprising:
an output device in signal communication with the tail strike warning processor for presenting an alert if the tail strike warning processor has determined that a warning condition exists based on the determined position of the tail of the aircraft and a predefined threshold.

11. The system of claim 1, wherein the transmitter produces a modulated radar signal having a linearity error less than 0.5%.

12. The system of claim 7, wherein modulation quality of transmitter remains constant over time.

13. The system of claim 7, wherein a signal-to-noise ratio associated with processing of the digital signal remains constant over time.

14. A method performed by a radar altimeter system on an aircraft, the method comprising:
generating a clock signal;
generating a reference signal using a direct digital synthesizer;
offsetting the reference signal by combining the reference signal with the clock signal;
generating a radar signal using a transmitter having a closed loop circuit that receives the offset reference signal;
outputting the generated radar signal via an antenna; and
receiving a radar signal at a receiver via the antenna, wherein the offset reference signal is greater than at least 30 MHz.

15. The method of claim 14, further comprising:
converting the signal received by the receiver into a digital signal;
sending the digital signal to a component; and
determining at the component an altitude value based on the digital signal;
generating the control signal based on the digital signal, wherein the component is remotely located from the receiver, transmitter, and antenna.

16. The method of claim 15, wherein the component is located in an electronics bay of the aircraft.

17. The method of claim 15, further comprising:
presenting an alert if the altitude value is below a threshold value.

18. The method of claim 14, wherein the closed-loop circuit is a phased-locked loop circuit.

19. The method of claim 14, wherein the generated radar signal has a linearity error less than 0.5%.

20. The method of claim 14, wherein modulation quality of the radar signal remains constant over time.

* * * * *